(12) United States Patent
Kornhauser et al.

(10) Patent No.: US 6,892,133 B2
(45) Date of Patent: May 10, 2005

(54) THIN-CLIENT NAVIGATION AND ROUTE GUIDANCE SYSTEM

(75) Inventors: Alain L. Kornhauser, Princeton, NJ (US); David Bernstein, Mt. Crawford, VA (US); Mark A. Hornung, Skillman, NJ (US)

(73) Assignee: ALK Technologies, Inc., Princeton, NJ (US)

( * ) Notice: Subject to any disclaimer, the term of this patent is extended or adjusted under 35 U.S.C. 154(b) by 95 days.

(21) Appl. No.: 10/467,724

(22) PCT Filed: Feb. 25, 2002

(86) PCT No.: PCT/US02/05744

§ 371 (c)(1),
(2), (4) Date: Aug. 11, 2003

(87) PCT Pub. No.: WO02/069100

PCT Pub. Date: Sep. 6, 2002

(65) Prior Publication Data

US 2004/0078139 A1 Apr. 22, 2004

Related U.S. Application Data

(60) Provisional application No. 60/271,393, filed on Feb. 26, 2001.

(51) Int. Cl.[7] ............................. G01C 21/26; G05D 1/00
(52) U.S. Cl. ..................... 701/209; 701/201; 701/210; 340/995.17; 340/995.23
(58) Field of Search ................................ 701/209, 201, 701/208, 210, 205, 211; 340/988, 990, 995.17, 995.23, 995.25

(56) References Cited

U.S. PATENT DOCUMENTS

| | | | | |
|---|---|---|---|---|
| 5,177,685 A | 1/1993 | Davis et al. | ............... | 705/400 |
| 5,293,163 A | 3/1994 | Kakihara et al. | ...... | 340/995.13 |
| 5,652,706 A | 7/1997 | Morimoto et al. | .......... | 701/210 |
| 5,675,492 A | 10/1997 | Tsuyuki | ...................... | 701/210 |
| 5,862,509 A | 1/1999 | Desai et al. | ................ | 701/209 |
| 5,875,412 A | 2/1999 | Sulich et al. | ............... | 701/207 |
| 5,893,081 A | 4/1999 | Poppen | ....................... | 705/400 |
| 5,916,299 A | 6/1999 | Poppen | ....................... | 701/202 |
| 6,014,607 A | 1/2000 | Yagyu et al. | ............... | 701/202 |
| 6,016,485 A | 1/2000 | Amakawa et al. | .......... | 705/400 |
| 6,038,509 A | 3/2000 | Poppen et al. | ............. | 701/210 |
| 6,052,645 A | 4/2000 | Harada | ....................... | 701/212 |
| 6,064,941 A | 5/2000 | Nimura et al. | ............. | 701/210 |
| 6,070,122 A | 5/2000 | Ishida et al. | ................ | 701/208 |
| 6,107,944 A | 8/2000 | Behr et al. | ............. | 340/995.12 |
| 6,192,314 B1 | 2/2001 | Khavakh et al. | ............ | 701/209 |
| 6,199,009 B1 | 3/2001 | Meis et al. | ................. | 701/202 |
| 6,199,013 B1 | 3/2001 | O'Shea | ....................... | 701/211 |
| 6,211,798 B1 | 4/2001 | Albrecht et al. | ............ | 340/990 |
| 6,668,227 B2 * | 12/2003 | Hamada et al. | ............. | 701/208 |
| 6,675,093 B1 * | 1/2004 | Childs et al. | ............... | 701/209 |

* cited by examiner

Primary Examiner—Tan Q. Nguyen
(74) Attorney, Agent, or Firm—Synnestvedt Lechner & Woodbridge, LLP; Richard C. Woodbridge, Esq.; Thomas J. Onka, Esq.

(57) ABSTRACT

A client/server navigation system utilizes partial route guidance trees, enabling a thin, mobile client to detect route deviation and provide alternate instructions while awaiting response from a server. The system (10) consists of a server (28) containing a network database and route-calculation program; a client (26) capable of obtaining (12) its current location and destination, displaying route instructions (22), and determining when it needs additional instructions from the server (20,24); and communication (30,32,34,36) between the client (26) and server (28). The invention allows for long routes and responsive operation on a small, low-powered client despite lags and lapses in communication.

22 Claims, 5 Drawing Sheets

THIN-CLIENT NAVIGATION AND ROUTE GUIDANCE SYSTEM

CROSS REFERENCE TO RELATED APPLICATIONS

This application claims the priority of provisional U.S. application Ser. No. 60/271,393 filed on Feb. 26, 2001 and entitled "Thin-Client Navigation and Route Guidance System" by Alain L. Kornhauser, David Bernstein and Mark Homung, the entire contents and substance of which are hereby incorporated in total by reference.

BACKGROUND OF THE INVENTION

1. Field of the Invention

This invention relates to a system and method for navigation and route guidance by an object, person or vehicle along a network.

2. Description of the Related Art

To successfully reach a destination one must find a way there, with sufficient efficiency so the value of the journey exceeds its cost. A variety of systems and devices have been invented to assist in this task: line-of-sight, maps, directions, compass, and sextant, to name a few. Many of these systems and devices have been adapted to the computer, and new systems have been and are being developed.

A special case of finding one's way is when travel is constrained to the links and intersections of a network. This is typically the case in travel on land, where one can quickly get in trouble by straying from the path or road. Except for sailors and astronauts, most humans (and many animals) travel predominantly on networks and navigate along those networks.

A number of computerized systems have been developed to aid in navigation, route finding, and route guidance along networks. The currently available systems can be classified into three types. First-generation systems provide a map and the ability to view and interrogate the map. Second-generation systems extend this with an automated determination of current location, typically by means of a global positioning system (GPS) receiver, and an automated display of this location on the map. Third-generation systems issue turn-by-turn directions to the user's destination, by finding the user's current location and destination on the network, and calculating a recommended route in between.

All three types of systems have been implemented in stand-alone configurations and in client/server configurations. In a stand-alone configuration, a single computer contains sufficient resources to store all the necessary map data and perform all the necessary calculations. In a client/server configuration, this work is split between at least two computers, a client and a server, connected by a means of communication. Client/server configurations can be either thick-client, in which most of the data and calculations are on the clients, or thin-client, in which most of the data and calculations are on the server.

Since the server does most of the work in a thin-client configuration, the client computer can be relatively small, low-powered, and inexpensive. This is an attractive goal for a mobile application such as route guidance. However, the client is then dependent on reliable and responsive wireless communication with the server. Unfortunately, wireless data communication is relatively unreliable, due to gaps caused by poor reception; unresponsive, due to delays in switching packets through the network; and expensive. As a result, existing third-generation thin-client navigation systems perform poorly compared to their stand-alone equivalents, because they are unable to reliably and quickly find routes when the user deviates from the route (e.g., when the user misses a turn, or is forced to detour).

On the other hand, stand-alone systems suffer from lack of current knowledge of traffic congestion; weather (ice, snow, high winds, etc.); new, closed, or improved roads; and other temporal information valuable to finding good routes, and require larger, more expensive, more power-consuming client computers.

Thick-client systems suffer from either being prohibitively slow or requiring prohibitively expensive communications bandwidth, and also require larger, more expensive, more power-consuming client computers.

For these reasons, a thin-client navigation system is desirable, if a method can be found to efficiently buffer a sufficient portion of the map data and calculation on the client device, so it can continue to provide guidance if the user deviates from the recommended route, despite brief delays or interruptions in communication with the server.

U.S. Pat. No. 6,052,645 describes a system in which a client permanently stores a map of main roads and requests detailed maps from a server as needed. The client performs route calculations using the maps. This is a thick-client system because the client must have significant storage capacity to permanently store a map of main roads and a powerful processor to perform route calculations. When the client detects a deviation from route it requests from the server a detailed map around the point of deviation that the client can use to calculate a new route. Given that the necessary mobile communication network has slow throughput and is likely to be interrupted, and that significant time is required to calculate a new route once the detailed map data is received, a user of this system is likely to have to wait an unacceptably long amount of time before the detailed map is displayed and/or new turn instructions are available.

U.S. Pat. No. 6,107,944 describes a system in which map storage and route calculation is performed by a server that communicates compact maneuver (turn) instructions to a client. This is a thin-client system because the client will need only minimal storage to hold the compact turn instructions and a minimal processor to display them. The turn instructions provided to the client might be used to detect deviation from route, if provided in sufficient detail. However, once deviation is detected, the client would need to wait to receive a new set of instructions from the server. A user of this system would either not have the benefit of route deviation detection, or would have to wait an unacceptably long amount of time before new turn instructions would be available.

The following U.S. patents are cited for their general discussion of navigation and route guidance systems of possible relevance: U.S. Pat. Nos. 5,177,685; 5,293,163; 5,652,706; 5,675,492; 5,862,509; 5,875,412; 5,893,081; 5,916,299; 6,014,607; 6,016,485; 6,038,509; 6,064,941; 6,070,122; 6,192,313; 6,192,314; 6,199,009; 6,199,013; 6,211,798.

SUMMARY OF THE INVENTION

Briefly described, the invention comprises a navigation and route guidance system and method suitable for client-server operation using thin clients, applicable to a wide variety of different servers, clients, and communications channels.

According to the present invention, the thin client is responsible for accepting input of the user's destination, determining current position using GPS or other means, and displaying the route guidance instructions and/or map. The server is responsible for storing the complete map data, and accepting and executing route requests from the clients.

A unique aspect of this invention is the way in which routes are requested, organized and delivered to the client. Specifically, the server determines the best route from every location on the relevant network to the client's destination. It then sends the client only the portions of those routes proximate to the client's current location. As the client moves, it compares its current location to the portions of the routes previously received and if it is nearing the boundary of those routes it requests the server to send a new portion. This enables the client to provide route guidance on networks that are too large to store locally on the client, while being able to provide new route guidance if the client deviates from the original route, without waiting to receive a new route from the server.

The invention may be more fully understood by reference to the following drawings.

DETAILED DESCRIPTION OF THE PREFERRED EMBODIMENT

During the course of this description like letters will be used to identify like elements according to the different views that illustrate the invention.

At the heart of this invention is a guidance tree. To understand a guidance tree it is necessary to understand a graph and how networks can be represented as graphs.

Figure 1:
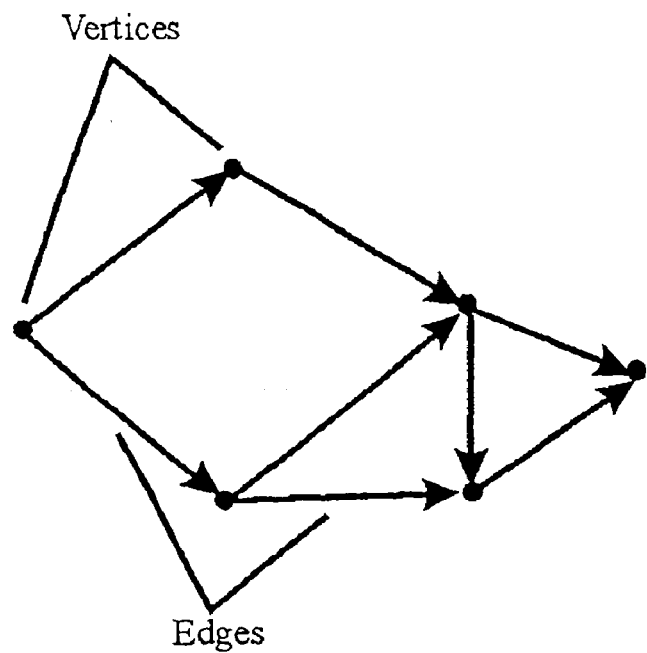
FIG. 1 is a graph consisting of vertices (nodes) represented by circles (points), and edges (links or arcs), represented by arrows (directed lines).

A graph embodies a mathematical concept. It consists of a set of vertices (nodes) and a set of edges (links or arcs). Pictorially, vertices are usually represented as circles and edges are usually represented as arrows connecting the circles. An example of a graph represented using this pictorial convention is shown in FIG. 1.

Figure 2A:
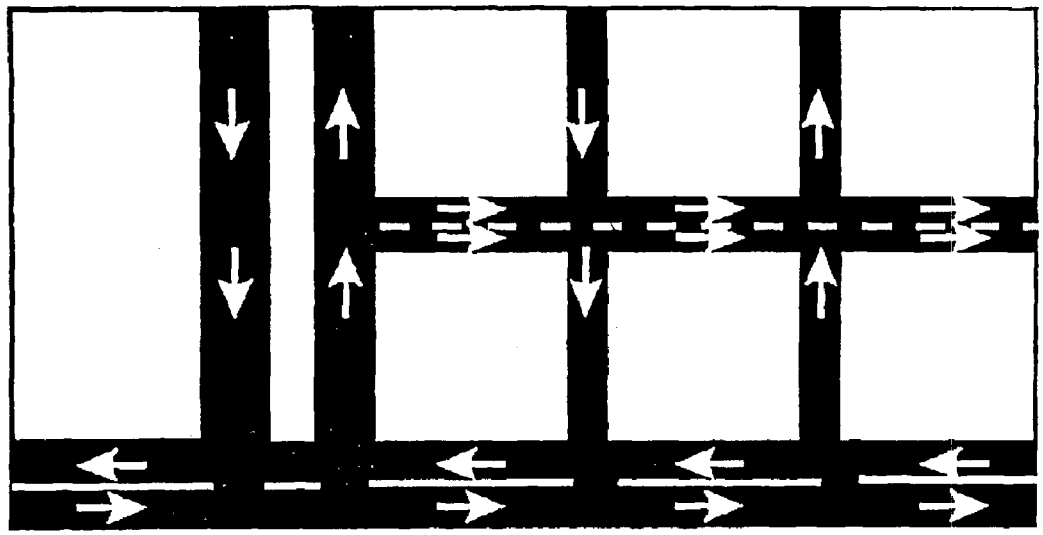
FIG. 2A illustrates a network of intersections and one-way and two-way street segments.
Figure 2B:
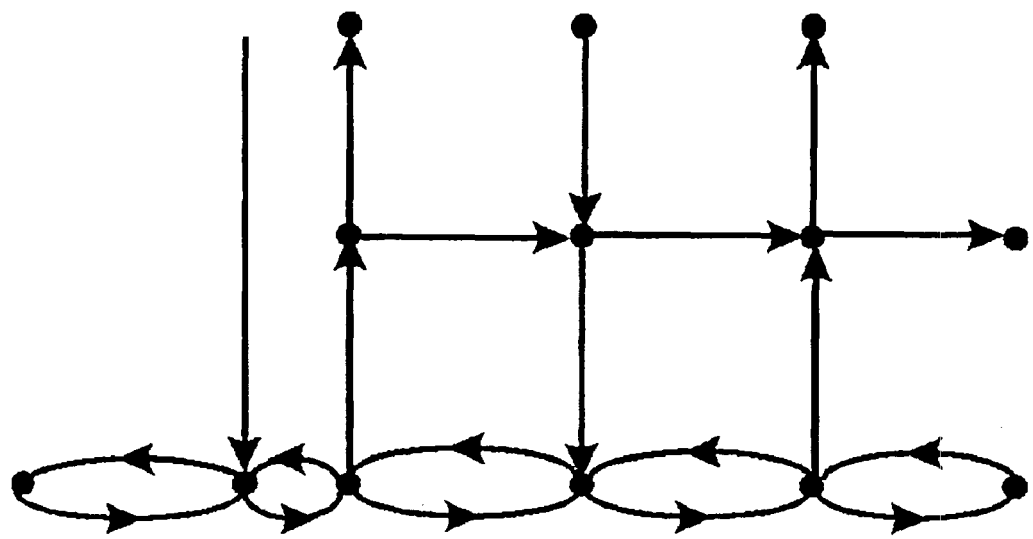
FIG. 2B illustrates the same network as a graph, with each intersection represented by a vertex and each street segment and direction of travel represented by an edge.
Figure 2C:
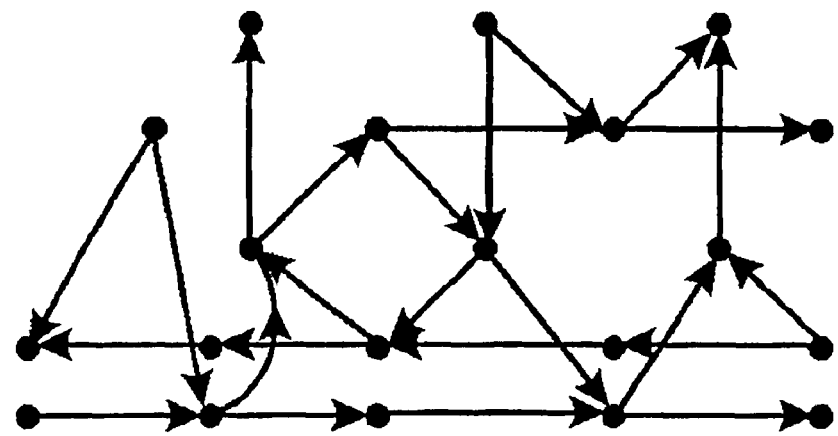
FIG. 2C illustrates the network of FIGS. 2A and 2B as a different graph, with each street segment and direction of travel represented by a vertex, and each allowable movement between street segments by an edge.

Networks can be represented as graphs in a number of different ways. Consider, for example, the small network of streets and intersections shown in FIG. 2A. One way to construct a graph from this network is to represent each intersection by a vertex and each street segment and direction of travel by an edge. This is illustrated in FIG. 2B. Another way to construct a graph from this network is to represent each street segment and direction of travel by a vertex and represent each allowable movement between street segments by an edge. This is illustrated in FIG. 2C.

Guidance trees can be constructed from any graph, regardless of the underlying network representation. A guidance tree contains all of the vertices in the graph and the edges that are on a best route from any vertex to a particular destination.

Figure 3A:
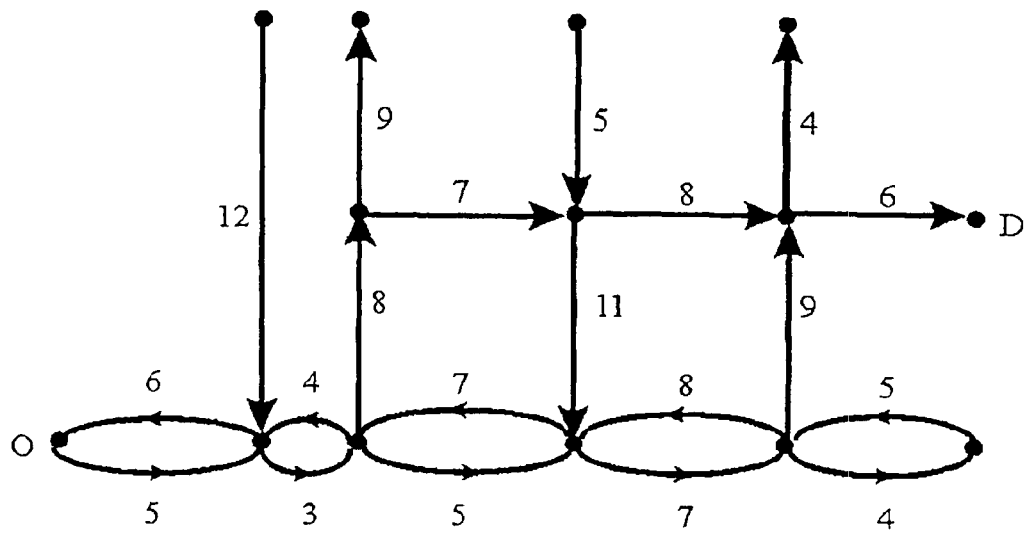
FIG. 3A illustrates the graph of FIG. 2B with each edge labeled by the value of its cost, and particular vertices labeled O and D.

A best route is the sequence of edges between two vertices where the sum of the edge costs is minimized. For example, consider the graph shown in FIG. 3A and suppose that the user's destination is vertex D, that she/he is interested in taking the least cost (fastest, shortest, and/or cheapest) route to his/her destination, and that the number shown next to each edge is the cost of traversing that edge.

Figure 3B:
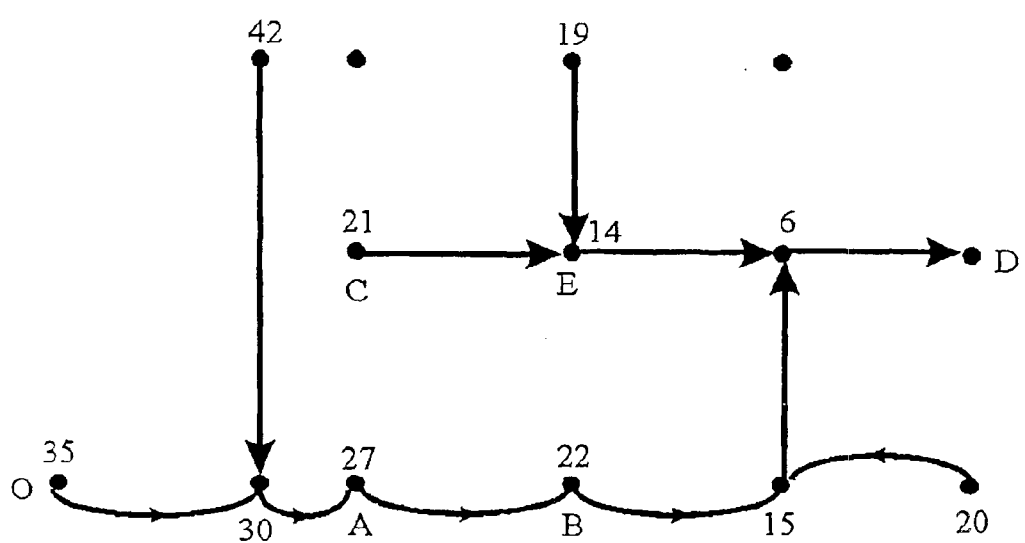
FIG. 3B illustrates a guidance tree to vertex D from the graph of FIG. 3A that traces the least-cost path to vertex D from every other vertex, with each vertex labeled with the total cost to reach D from that vertex, and particular vertices labeled with reference letters.

The resulting guidance tree to vertex D is shown in FIG. 3B. In this figure, the number next to each vertex represents the cost from that node to the destination along the least-cost route. The edge emanating from each vertex is the edge that the user should use to remain on the least-cost path.

The guidance tree in FIG. 3B is a complete guidance tree, specifying the least-cost route from every vertex on the graph to vertex D. If the user diverges from the recommended route, for whatever reason, the guidance tree is always valid and sufficient to guide him/her to vertex D. For example, suppose that the user starts at vertex O and proceeds to vertex A, then accidentally makes a left turn at A, proceeding to C rather than going straight to B. The guidance tree continues to be valid, showing that the least-cost route from C to D is via vertex E.

In a typical route guidance application, the network and consequently the graph and guidance tree can be very large. As an example, consider that an automobile driver in North America can freely drive anywhere on any public street in the continent. In a typical thin-client client/server environment, the communication bandwidth between the server and client is insufficient to transmit the entire tree quickly enough to be acceptable to the user, and the data storage capacity of the thin-client device may be insufficient to hold the complete guidance tree. To solve this problem, this present invention makes use of local guidance trees.

A local guidance tree is a portion of a complete guidance tree. In a local guidance tree, only vertices that are near the current location of the client are included. Edges that connect these nearby vertices are included individually, and edges that connect the destination to these nearby vertices are aggregated together.

Figure 4A:
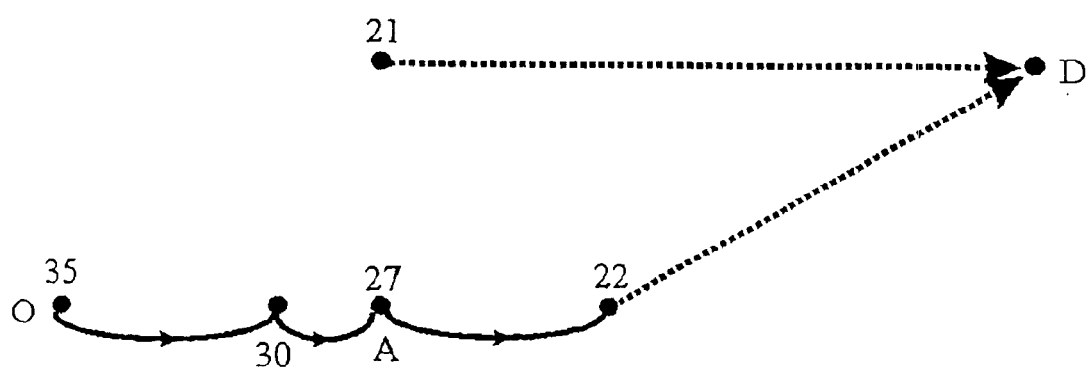
FIG. 4A illustrates the local guidance tree to vertex D from vertex O from the guidance tree in FIG. 3B.

FIG. 4A shows an example of a local guidance tree derived from the complete guidance tree in FIG. 3B. In this example, the user's current location is vertex O. The user's destination is vertex D. The local guidance tree includes edges and vertices that can be reached from O in 3 edges or less (this number is chosen only for purpose of this example). The local guidance tree also includes aggregated edges between D and the vertices within 3 edges of O that are closest to D. In this example using a local guidance tree, the server needs to transmit and the client needs to store only the 6 vertices and 5 edges shown in FIG. 4A rather than the 14 vertices and 11 edges shown in FIG. 3B.

Figure 4B:
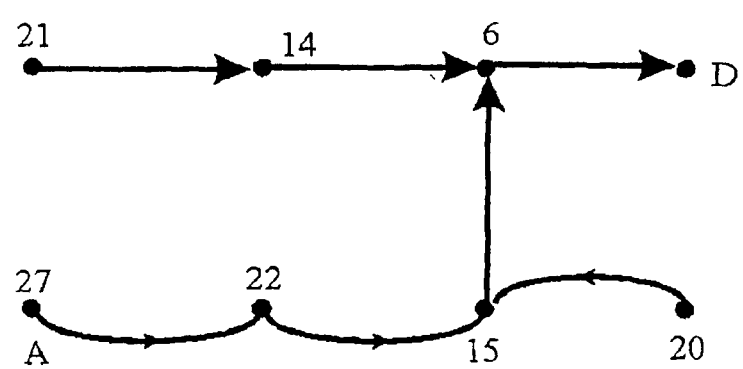
FIG. 4B illustrates the local guidance tree to vertex D from vertex A from the guidance tree in FIG. 3B.

As the user progresses on his/her route, the client will need to periodically retrieve downstream local guidance trees. For example, as the user approaches vertex A, the client would request a new local guidance tree and would be sent the tree shown in FIG. 4B.

Various methods can be used to determine what portion of the guidance tree is proximate to a user's current location. In the examples in FIGS. 4A and 4B, vertices within 3 edges of the user's location were included. Another method would be to include vertices within a certain number of units of time (a specific kind of cost) of the user's location, for example, vertices within 10 minutes of a user's location. In practice, the size of the local guidance tree will depend on the capabilities of the client, the means of communication, and the speed of travel relative to the density of the network.

The server in this invention performs one main function, namely to provide the client with local guidance trees. The specific local guidance tree it provides is determined by the client's location, the user's destination, the amount of data storage available on the client, and the reliability, responsiveness, bandwidth and speed of communication between the server and the client, relative to how quickly the user can traverse the tree.

For the server to perform this function it must be able to generate a local guidance tree. The server has the ability to calculate complete guidance trees from a graph. It also has the ability to store and retrieve guidance trees. So, in some cases, to construct a local guidance tree it simply retrieves a pre-calculated guidance tree from its database and in other cases, particularly the first time a guidance tree is requested for a given destination, it calculates the guidance tree.

The client according to this invention requires minimal memory and computational power, making it suitable for a thin device. The client uses a vehicle location system (for example, the Global Positioning System and/or dead reckoning) to regularly determine its latitude and longitude (for example, 20 times per minute), and (optionally) to derive its direction of travel. It then compares this to the latitudes and longitudes of the vertices and edges of the local guidance tree it is currently storing, to determine which edge it is on or nearest. If its map-matched location is near the boundary of its current local guidance tree, or its destination has changed, it requests a new local guidance tree from the server. The request includes the destination and the map-matched location. The client receives the local guidance tree from the server and uses it to provide the user with route guidance information in the form of turn instructions and/or a map.

Figure 5:
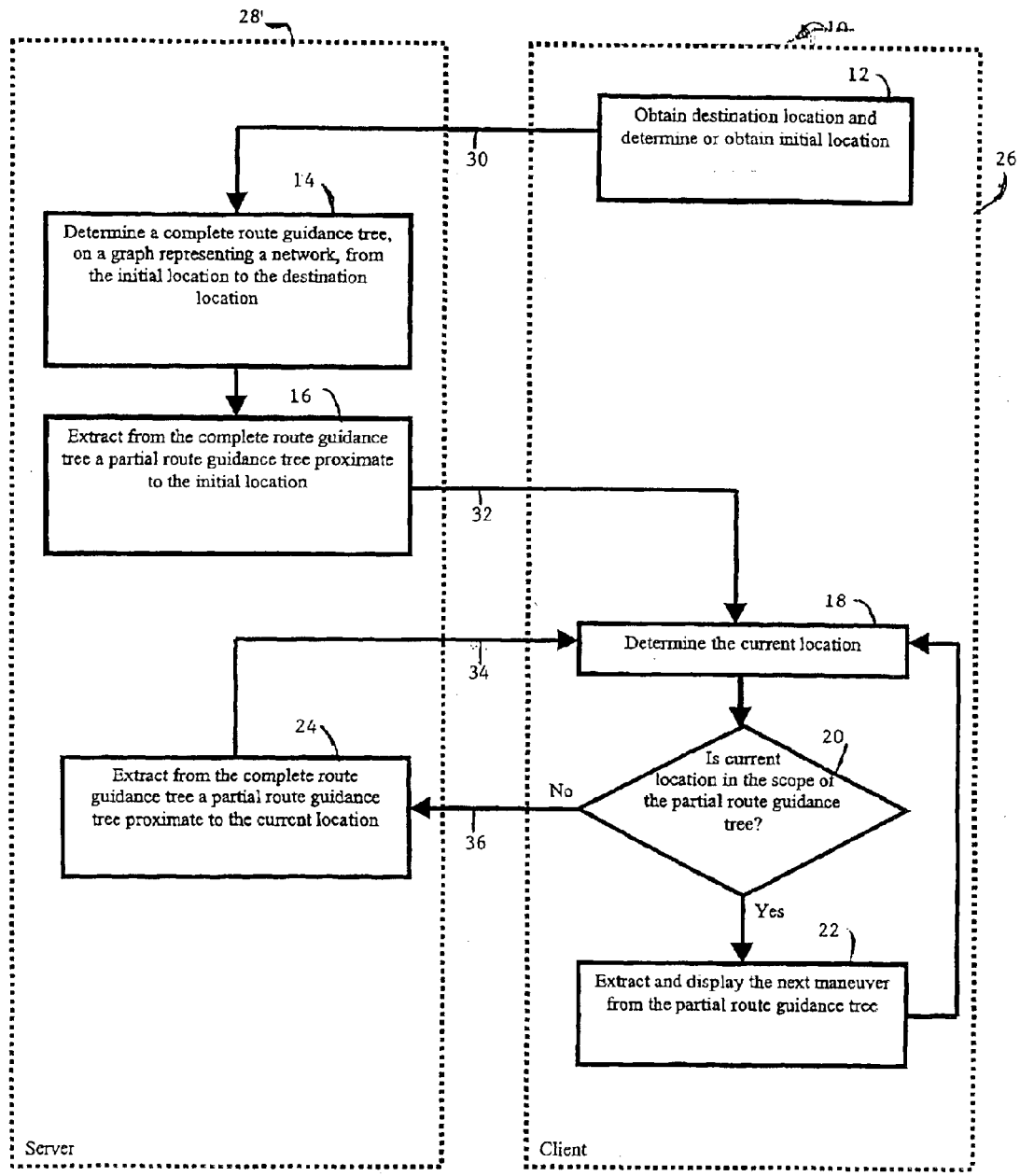
FIG. 5 illustrates the preferred embodiment of the inventive systems and method in the form of a flow chart.

This method and the division of responsibility between server and client is illustrated in FIG. 5 in the form of a flowchart.

While the invention has been described with reference to the preferred embodiment thereof, it will be appreciated by those of ordinary skill in the art that modifications can be made to the system and steps of the invention without departing from the spirit and scope of the invention as a whole.

We claim:

1. A method (10) for guiding an object, person or vehicle to its destination along a network, comprising the following steps:
   a. obtaining (12) destination location and determining or obtaining initial location;
   b. determining (14) a complete route guidance tree, on a graph representing a network, from the initial location to the destination location;
   c. extracting (16) from the complete route guidance tree a partial route guidance tree proximate to the initial location;
   d. determining (18) the current location;
   e. determining (20) whether the current location is in the scope of the partial route guidance tree;
   f. if the current location is in the scope of the partial route guidance tree, extracting and displaying (22) the next maneuver from the partial route guidance tree, but if the current location is not in the scope of the partial route guidance tree, extracting (24) a partial route guidance tree proximate to the current location; and,
   g. repeating steps d through f until either the destination is reached or the method is interrupted.

2. The method as claimed in claim 1 wherein said graph representing a network represents directional segments as edges and the intersections between segments as vertices.

3. The method as claimed in claim 2 wherein proximate to is based on vertices within a predetermined number of edges of the current location.

4. The method as claimed in claim 2 wherein proximate to is based on vertices within a predetermined number of units of network cost from the current location.

5. The method as claimed in claim 2 wherein proximate to is based on vertices within a predetermined amount of estimated time from the current location.

6. The method as claimed in claim 1 wherein the graph representing the network represents directional segments as vertices and allowable movements between segments as edges.

7. The method as claimed in claim 6 wherein proximate to is based on vertices within a predetermined number of edges of the current location.

8. The method as claimed in claim 6 wherein proximate to is based on vertices within a predetermined number of units of network cost from the current location.

9. The method as claimed in claim 6 wherein proximate to is based on vertices within a predetermined amount of estimated time from the current location.

10. A system for guiding an object, person or vehicle to its destination along a network, comprising:
    a. a server means (26) for storing a database representing a physical network, determining (14) a route guidance tree to a destination location on a graph representing that network, and extracting (16) the portion of the route guidance tree proximate to a particular location;
    b. a communication means (30, 32, 34, 36) for passing information between the server means and at least one client means; and,
    c. a client means (26) for obtaining (12) destination location, determining (18) or obtaining the client's current location, transmitting to the server means using the communication means the destination location and current location, receiving from the server means using the communication means a portion of the route guidance tree proximate to the current location, determining (20) whether the current location is in the scope of this route guidance tree, and either extracting (22) the next maneuver from this route guidance tree, or requesting (24) from the server means using the communication means (36) a further portion of the route guidance tree proximate to the current location.

11. The system as claimed in claim 10 wherein the physical network comprises roadways.

12. The system as claimed in claim 11 wherein the graph representing the physical network represents directional roadway segments as edges and the intersections between roadways as vertices.

13. The system as claimed in claim 12 wherein proximate to is based on vertices within a predetermined number of edges of the current location.

14. The system as claimed in claim 12 wherein proximate to is based on vertices within a predetermined number of units of network cost of the current location.

15. The system as claimed in claim 12 wherein proximate to is based on vertices within a predetermined amount of estimated time from the current location.

16. The system as claimed in claim 11 wherein the graph representing the physical network represents directional roadway segments as vertices and allowable movements between segments as edges.

17. The system as claimed in claim 16 wherein proximate to is based on vertices within a predetermined number of edges of the current location.

18. The system as claimed in claim 16 wherein proximate to is based on vertices within a predetermined number of units of network cost of the current location.

19. The system as claimed in claim 16 wherein proximate to is based on vertices within a predetermined amount of estimated time from the current location.

20. The system as claimed in claim 10 wherein proximate to is based on vertices within a predetermined number of edges of the current location.

21. The system as claimed in claim 10 wherein proximate to is based on vertices within a predetermined number of units of network cost from the current location.

22. The system as claimed in claim 10 wherein proximate to is based on vertices within a predetermined amount of estimated time from the current location.

* * * * *